United States Patent
De Jager

[11] 3,967,884
[45] July 6, 1976

[54] THREE ELEMENT OBJECTIVE LENS

[75] Inventor: Donald De Jager, Rochester, N.Y.

[73] Assignee: Eastman Kodak Company, Rochester, N.Y.

[22] Filed: Nov. 5, 1974

[21] Appl. No.: 521,227

[52] U.S. Cl. ............................ 350/226; 350/189
[51] Int. Cl.² ..................... G02B 9/14; G02B 3/04
[58] Field of Search ........................... 350/226, 189

[56] References Cited
UNITED STATES PATENTS

| | | | |
|---|---|---|---|
| 2,530,397 | 11/1950 | Merté | 350/189 |
| 3,194,139 | 7/1965 | Babcock | 350/189 X |
| 3,575,082 | 4/1971 | McClune | 350/189 |
| 3,762,801 | 10/1973 | Baker | 350/189 |
| 3,838,910 | 10/1974 | Ruben | 350/226 X |
| 3,868,173 | 2/1975 | Miles et al. | 350/189 |

*Primary Examiner*—John K. Corbin
*Assistant Examiner*—Conrad Clark
*Attorney, Agent, or Firm*—J. A. Morrow

[57] ABSTRACT

An objective lens comprising a front positive meniscus element, a middle negative biconcave element and a rear positive biconvex element. Improved optical performance at a relative aperture of f/1.70 is achieved by the incorporation of an asphere on the rear surfaces of the first and second elements.

2 Claims, 1 Drawing Figure

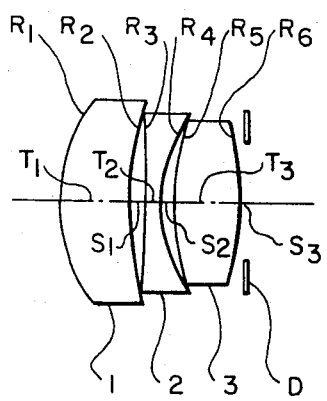

THREE ELEMENT OBJECTIVE LENS

BACKGROUND OF THE INVENTION

1. Field of the Invention

The present invention relates to photographic objective lenses and in particular to such lenses that comprise three air spaced elements.

2. Description of the Prior Art

Triplet lenses for use in photographic apparatus are well known and have been used for many years. Moreover, high relative aperture lenses have also been in use for many years in the photographic industry. However, with the advent of available light photography, the use of high relative aperture lenses has spread to photographic apparatus designed to be mass produced for the amateur market. The price of such lenses then becomes of great concern and the relatively complex, well corrected, high relative aperture lenses known in the art are too costly.

Another trend in the photographic industry is toward compact designs to provide convenience in storage, handling and transportation. Large, complex lenses represent a sizable percentage of the camera's volume and place a lower limit on the size of the photographic apparatus. A reduction in the number of elements in a lens will generally aid in reducing the size and cost of the lenses to be incorporated in the photographic apparatus.

SUMMARY OF THE INVENTION

In accordance with the present invention, there is provided a three element air spaced objective lens comprising a front positive meniscus element, a middle negative biconcave element and a rear positive biconvex element, with a diaphragm positioned to the rear of the lens. Good optical performance is achieved by incorporation of an asphere on the rear surfaces of the first two elements of the lens, and by the use of glass having a very high index of refraction for all three elements.

BRIEF DESCRIPTION OF THE DRAWING

In the detailed description of the preferred embodiment of the invention presented below, reference is made to the accompanying drawing which is a diagrammatic axial cross-section of a lens according to the present invention.

DESCRIPTION OF THE PREFERRED EMBODIMENT

For all purposes of describing or claiming of the invention, the term lens will be used to describe the complete lens and not the elements thereof. In the drawing, the elements are numbered from left to right with Arabic numerals. In each of the examples, the elements, indices of refraction N, Abbe numbers V, radii of curvature R, thicknesses T and air spaces S are numbered to correspond with the drawing. The indices of refraction are for the 0.5876 micron helium d line of the spectrum. The Abbe numbers are calculated utilizing this d line index and, as the dispersion, the index difference between the 0.4861 micron hydrogen F line and the 0.6563 micron hydrogen C line. Radii of curvature having centers of curvature to the right of the surface are considered positive; those with centers of curvature to the left of the surface are considered negative.

In all embodiments of the invention as illustrated in the drawing, the lens comprises three air spaced elements. Element 1 is a front positive meniscus element. Element 2 is a middle negative biconcave element. Element 3 is a rear positive biconvex element. D is a diaphragm.

The use of aspheric surfaces in a lens design provides additional parameters for correction of aberrations. Incorporation of an aspheric surface is particularly useful in a high relative aperture lens, because it permits a better correction of spherical aberration than is otherwise obtainable. In the design of the present invention, the improved spherical aberration correction and the reduction of other aberrations, along with the high relative aperture, are achieved by the use of aspheres on surfaces 2 and 4 of the lens.

A general aspheric surface may be described by the following equation:

$$x = \frac{Cy^2}{1 + \sqrt{1 - (1+K)C^2y^2}} + Dy^4$$

This equation describes a surface in terms of its surface sag x at a semi-aperture distance y from the axis of the lens. The constat C is the vertex curvature, that is, the surface curvature at the vertex of the lens, equal to the reciprocal of the vertex radius of curvature R. The constant K is the conic constant and is defined by the equation $K = -e^2$ where e is the eccentricity of the surface. Certain values of K describe conic sections or surfaces of revolution about the optical axis of the lens. The coefficient D determined the first term of higher order aspheric sag of the surface and is selected to achieve the higher order corrections that are desired. Terms higher than the quartic in the equation for x may also be included, if desired.

Lenses may be made according to this invention by following the specification in the preferred embodiment presented below:

EXAMPLE I

| Element | N | V | Radius mm | Thickness or Separation mm |
|---|---|---|---|---|
| 1 | 2.01940 | 34.21 | $R_1$=13.506 | $T_1$=6.000 |
| | | | $R_2$=Asphere | $S_1$=1.210 |
| | | | $R_3$=−185.19 | |
| 2 | 1.90893 | 19.31 | | $T_2$=1.200 |
| | | | $R_4$=Asphere | $S_2$=1.340 |
| | | | $R_5$=25.258 | |
| 3 | 2.01940 | 34.21 | | $T_3$=6.000 |
| | | | $R_6$=−25.258 | $S_3$=.500 |

Example I is an all glass triplet objective which is characterized by a relative aperture of f/1.70, with an effective focal length of 25.00 and a semifield angle of 23.70°. The lens is relatively compact with a total length of 15.750mm. In order to achieve the high relative aperture and good optical quality, aspheric surfaces have been incorporated on the rear surfaces of Elements 1 and 2. The asphere on Surface 2 represents a higher order correction to a spherical surface whereas the asphere on Surface 4 represents a hyperboloid of revolution around the optical axis. The respective coefficients for defining the two aspheres are given in the following table:

Table I

| Surface | R=1/C | K | D |
| --- | --- | --- | --- |
| 2 | 36.338 | 0 | 0.12283 × 10⁻³ |
| 4 | 9.4853 | −1.6218 | 0 |

The invention has been described in detail with particular reference to a preferred embodiment thereof, but it will be understood that variations and modifications can be effected within the spirit and scope of the invention.

I claim:

1. A three element objective lens comprising, from front to rear, a positive meniscus element, a negative biconcave element and a positive biconvex element, each of said elements being formed of a glass having an index of refraction in excess of 1.90 and said lens including an aspheric surface on the rear surfaces of said positive meniscus element and said negative biconcave element, said aspheric surfaces being represented by the following formula and parameters:

$$x = \frac{Cy^2}{1 + \sqrt{1 - (1+K)C^2y^2}} + Dy^4$$

| Surface | R=1/C | K | D |
| --- | --- | --- | --- |
| 2 | 36.338 | 0 | 0.12283 × 10⁻³ |
| 4 | 9.4853 | −1.6218 | 0 | wherein $x$ is the sag of the aspheric surface from a plane reference surface at a radial distance $y$ from the axis of the lens, C is equal to the reciprocal of the vertex radius of curvature R and K is the conic constant.

2. A three element objective lens comprising, from front to rear, a positive meniscus element, a negative biconcave element and a positive biconvex element, each of said elements being formed of a glass having an index of refraction in excess of 1.90 and said lens including an aspheric surface on the rear surfaces of said positive meniscus element and said negative biconcave element, said lens having a focal length of 25.00mm when constructed according to the parameters in the following table:

| Element | N | V | Radius mm | Thickness or Separation mm |
| --- | --- | --- | --- | --- |
| 1 | 2.01940 | 34.21 | $R_1$=13.506 | $T_1$=6.000 |
|  |  |  | $R_2$=Asphere |  |
|  |  |  | $R_3$=−185.19 | $S_1$=1.210 |
| 2 | 1.90893 | 19.31 |  | $T_2$=1.200 |
|  |  |  | $R_4$=Asphere |  |
|  |  |  | $R_5$=25.258 | $S_2$=1.340 |
| 3 | 2.01940 | 34.21 |  | $T_3$=6.000 |
|  |  |  | $R_6$=−25.258 |  |
|  |  |  |  | $S_3$=.500 | wherein, from front to rear, the elements are numbered from 1 to 3, the corresponding indices of refraction, N, and Abbe' numbers, V, are listed for each of the lens elements, the radii are numbered from $R_1$ to $R_6$, the thicknesses are numbered from $T_1$ to $T_3$ and the air spaces are numbered from $S_1$ to $S_3$, and wherein $R_2$ and $R_4$ represent the radius of curvature at the vertex of aspheric surfaces defined by the following formula and parameters:

$$x = \frac{Cy^2}{1 + \sqrt{1 - (1+K)C^2y^2}} + Dy^4$$

| Surface | R=1/C | K | D |
| --- | --- | --- | --- |
| 2 | 36.338 | 0 | 0.12283 × 10⁻³ |
| 4 | 9.4853 | −1.6218 | 0 | wherein x is the sag of the aspheric surface from a plane reference surface at a radial distance $y$ from the axis of the lens, C is equal to the reciprocal of the vertex radius R and K is the conic constant.

* * * * *